(12) United States Patent
Bocci

(10) Patent No.: US 10,238,206 B2
(45) Date of Patent: Mar. 26, 2019

(54) UNIVERSAL DESKTOP STAND FOR MOBILE ELECTRONIC DEVICES

(71) Applicant: Christopher Bocci, Ipswich, MA (US)

(72) Inventor: Christopher Bocci, Ipswich, MA (US)

(*) Notice: Subject to any disclaimer, the term of this patent is extended or adjusted under 35 U.S.C. 154(b) by 0 days.

(21) Appl. No.: 15/702,645

(22) Filed: Sep. 12, 2017

(65) Prior Publication Data

US 2018/0070719 A1 Mar. 15, 2018

Related U.S. Application Data

(60) Provisional application No. 62/394,021, filed on Sep. 13, 2016.

(51) Int. Cl.
*A47B 23/04* (2006.01)
*G06F 1/16* (2006.01)
*A47B 23/00* (2006.01)
*F16M 13/00* (2006.01)

(52) U.S. Cl.
CPC ............ *A47B 23/043* (2013.01); *A47B 23/00* (2013.01); *F16M 13/00* (2013.01); *G06F 1/1626* (2013.01); *G06F 1/1632* (2013.01)

(58) Field of Classification Search
CPC ... G06F 1/1632; G06F 1/1626; A47B 23/043; A47B 23/00; A47B 23/04; A47B 23/042
USPC ..... 248/447, 451, 453–458, 460–465, 441.1, 248/444, 917–918, 923
See application file for complete search history.

(56) References Cited

U.S. PATENT DOCUMENTS

| | | | | |
|---|---|---|---|---|
| 1,859,646 A * | 5/1932 | Apfelbaum | ............... | G09F 1/14 248/460 |
| 2,304,795 A * | 12/1942 | Bricker | .................. | A47G 1/142 248/453 |
| 2,611,427 A * | 9/1952 | Du Mais | ............... | G03B 21/58 160/24 |
| 2,806,669 A * | 9/1957 | Vernon | ................... | A47G 1/143 248/455 |
| D566,181 S * | 4/2008 | Gerules | ........................ | D19/113 |
| 7,568,668 B2 * | 8/2009 | Taekema | ................. | F16C 11/06 248/166 |
| 8,186,639 B2 * | 5/2012 | Wang | ..................... | F16M 11/10 248/163.1 |
| 8,899,543 B2 * | 12/2014 | Liang | .................. | A47B 23/043 248/166 |
| 8,961,220 B2 * | 2/2015 | Hilbourne | ............ | H01R 13/516 439/502 |
| 9,310,840 B2 * | 4/2016 | Beatty | ................... | G06F 1/1632 |
| 9,395,755 B2 * | 7/2016 | Lin | ........................ | F16M 11/04 |
| 9,689,523 B2 * | 6/2017 | Chardon | ................ | F16M 11/10 |
| 2006/0108493 A1 * | 5/2006 | Paris | ......................... | B41J 3/60 248/441.1 |

(Continued)

*Primary Examiner* — Nkeisha Smith
(74) *Attorney, Agent, or Firm* — Hamilton, Brook, Smith & Reynolds, P.C.

(57) ABSTRACT

A desktop stand is provided that includes at least two substantially cylindrical bodies in contact with each other and an extension hinging from one of the cylindrical bodies. The extension is movable to an open position and a closed position. The extension completes a circumference of the other of the cylindrical bodies when in the closed position and is configured to accept a mobile device in the open position to support the mobile device in an upright position for ease of viewing content displayed in its graphical user interface.

15 Claims, 7 Drawing Sheets

(56) References Cited

U.S. PATENT DOCUMENTS

2015/0260333 A1* 9/2015 Polyakov ............. F16M 11/041
                                                    248/176.3
2017/0090516 A1* 3/2017 Ku ........................ G06F 1/1632

* cited by examiner

UNIVERSAL DESKTOP STAND FOR MOBILE ELECTRONIC DEVICES

RELATED APPLICATION

This application claims the benefit of U.S. Provisional Application No. 62/394,021, filed on Sep. 13, 2016. The entire teachings of the above application are incorporated herein by reference.

BACKGROUND

Tablet computers and mobile devices are popular electronic devices due to their portability and small footprint. Children, in particular, now make extensive use of mobile devices, often viewing content on mobile devices for extended periods of time. When viewing content on tablet computers and mobile devices, users typically hold such devices in their hands, which can limit use of the devices for extended periods of time due to hand fatigue.

SUMMARY

A desktop stand is provided that can accommodate mobile devices ("devices") of any size while folding-up, in some embodiments, to provide a small storage footprint. Such devices are now ubiquitously used by children, who may be viewing content for extended periods of time on their mobile devices. The desktop stand can support a mobile device and provide a comfortable viewing angle for the user. Desktop stands can further, optionally, provide for integrated storage of mobile device accessories and/or an extended power source.

In one embodiment, a desktop stand includes at least two substantially cylindrical bodies in contact with each other and an extension hinging from one of the cylindrical bodies. The extension is movable to an open position and a closed position. In the closed position, the extension completes a circumference of the other of the cylindrical bodies. In the open position, the extension is configured to accept a mobile device. The extension and the cylindrical bodies can support the mobile device in an upright or substantially upright position on a desktop to provide for hands-free use of the device.

The extension can include two arms, each arm hinging from a respective end of the cylindrical body, and a curved region configured to cradle the mobile device. The two arms can be connected by a cross-member, which can optionally include a cut-out region configured to expose a button or other user interface feature of a mobile device supported by the stand. The extension can be moveable to a plurality of open positions, each position adjusting a viewing angle of a mobile device supported by the stand. The at least two substantially cylindrical bodies can be unitary or continuously formed.

As mobile devices typically require accessories for use, including, for example, power cords, extended batteries, and earphones, desktop stand 100 can advantageously provide integrated storage for such accessory items. One or both of the cylindrical bodies can be substantially hollow. A hollow cylindrical body can optionally include a door providing access to a storage compartment within the body. One or both of the cylindrical bodies can contain a power source. The power source may be enclosed in the stand, or integrated within the stand with at least one of the cylindrical bodies having an outlet, such as a Universal Serial Bus (USB) outlet, for connecting the power source via a typical interface cable to the mobile device. The power source can be, for example, a battery or an AC/DC converter.

Another embodiment of the desktop stand includes means for retaining a mobile device in a substantially upright position with a moveable extension in an open position. The desktop stand further includes means for adjusting the movable extension to a closed position, with the movable extension completing a circumference of a cylindrical body of the means for retaining the mobile device when the extension is in the closed position.

Yet another desktop stand includes at least two solid geometric bodies in contact with each other and an extension hinging from one of the solid geometric bodies that is movable between an open position and a closed position. The extension completes a shape of the other of the solid geometric bodies when in the closed position and is configured to accept a mobile device in the open position.

Additional embodiments are described herein and illustrated in the accompanying figures.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1A:
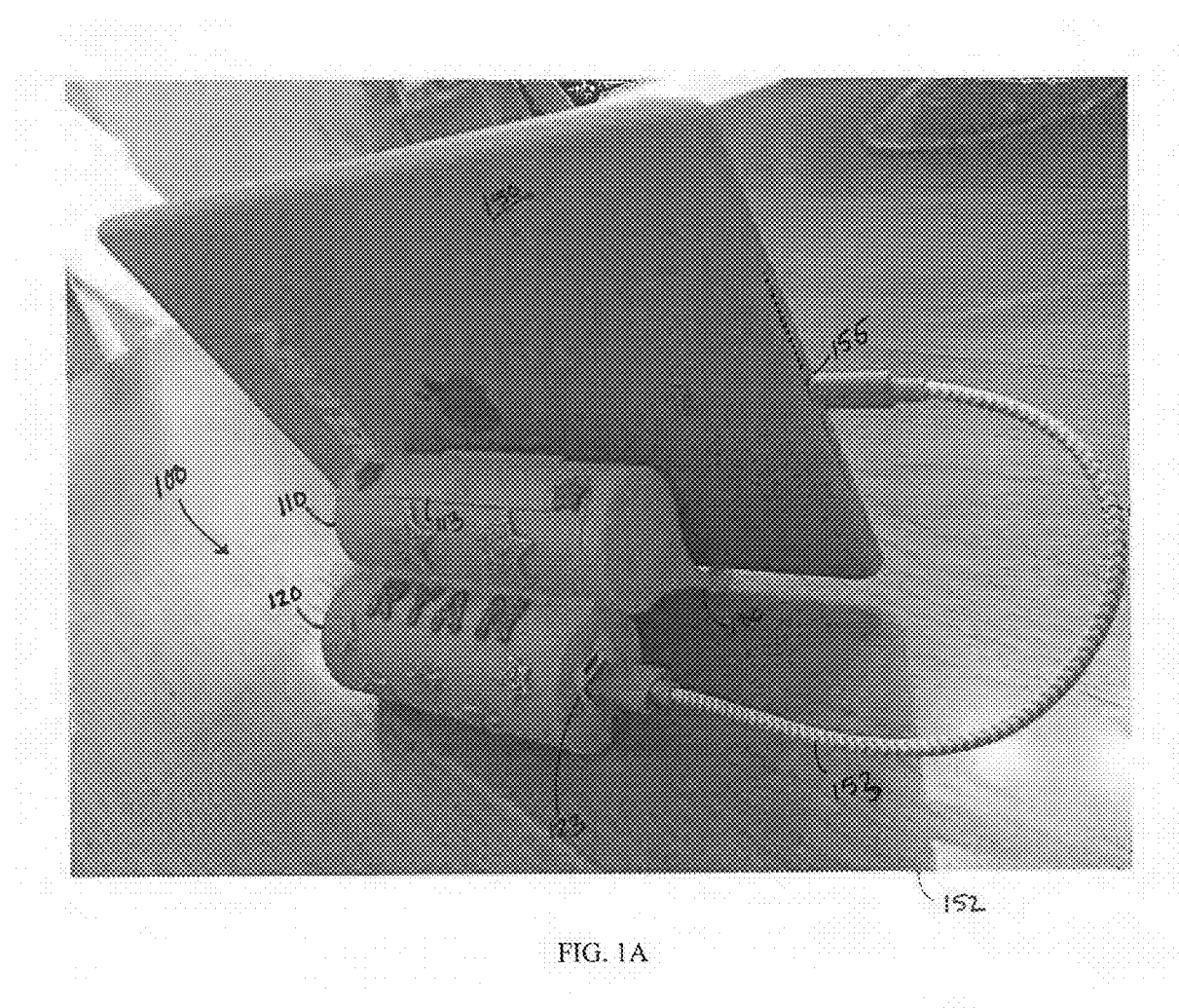
FIG. 1A is a perspective view of a desktop stand supporting a tablet.
Figure 1B:
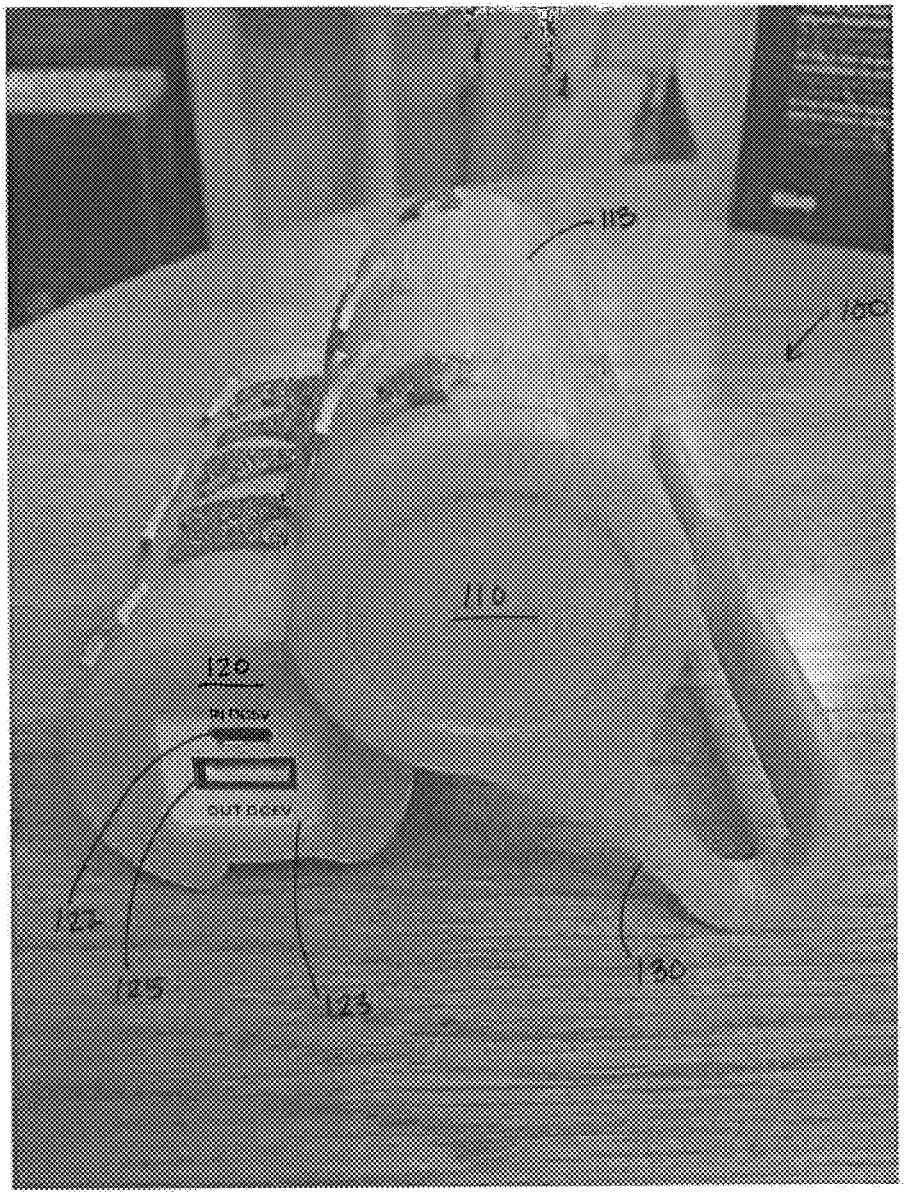
FIG. 1B is a side view of a desktop stand having an integrated power source.

As shown in FIGS. 1A and 1B, a desktop stand 100 has a first body 110 and a second body 120 in contact with one another. An extension 130 hinges from the first cylindrical body 110 to cradle a mobile device 150 and maintain the mobile device in a substantially upright position for viewing by a user of the device. As shown in FIG. 1, the first and second bodies 110, 120 are substantially cylindrical, with the mobile device 150 resting against the first cylindrical body 110 and the second cylindrical body 120, together with the extension 130, supporting the device stand 100 against a desktop 152.

The desktop stand 100 (also referred to herein as a "mobile device stand" or "device stand") can optionally house therein an integrated power supply, such as, for example, a rechargeable battery 123, as illustrated in FIGS. 1A and 1B. The rechargeable battery 123 includes a first port 125, such as a Universal Serial Bus (USB) Type-A port, which can serve as an outlet for connecting to a mobile device ("device"), and a second port 127, such as a USB Type B or Type-C port, which can service as an inlet for recharging the battery pack 123. The second body 120 defines openings for external access to the rechargeable battery's first and second ports 125, 127, respectively.

As shown, for example, in FIG. 1A, a USB cable 153 extends from outlet 123 to an inlet 155 at the mobile device 150, to provide power to the device 150. While the integrated power source is shown as residing in second body 120 of the stand 100, the power source can alternatively be located within first body 110 of the stand. Additionally, in place of a rechargeable battery 123, the integrated power supply can be an AC/DC converter allowing a user to draw power from a wall outlet to recharge the mobile device.

The desktop stand 100 can further optionally include one or more integrated storage compartments. For example, as illustrated in FIGS. 1A and 1B, the first body 110 can include a storage compartment accessible by a door 113. The first body 110 can be substantially hollow, allowing for the interior of the body to serve as the storage compartment. While the storage compartment is shown as residing within the first body 110 of the stand 100, a storage compartment can alternatively be located within the second body 120. Storage compartments can also be included within both bodies 110, 120. While the door 113 is shown as being located at an upwardly facing location on the first body 110, the door can alternatively be located at a downwardly facing location on the body and/or doors can be located at one or both of the ends of the body 110. Doors may be located at any location on the first and second bodies 110, 120 that is convenient for accessing items stored within the device 100 while the extension 130 is in an open or closed position.

The desktop stand 100 can fold or be separated into component parts (e.g., the first body 110 can be decoupled from the second body 120) for ease of storage when not in use.

Figure 2:
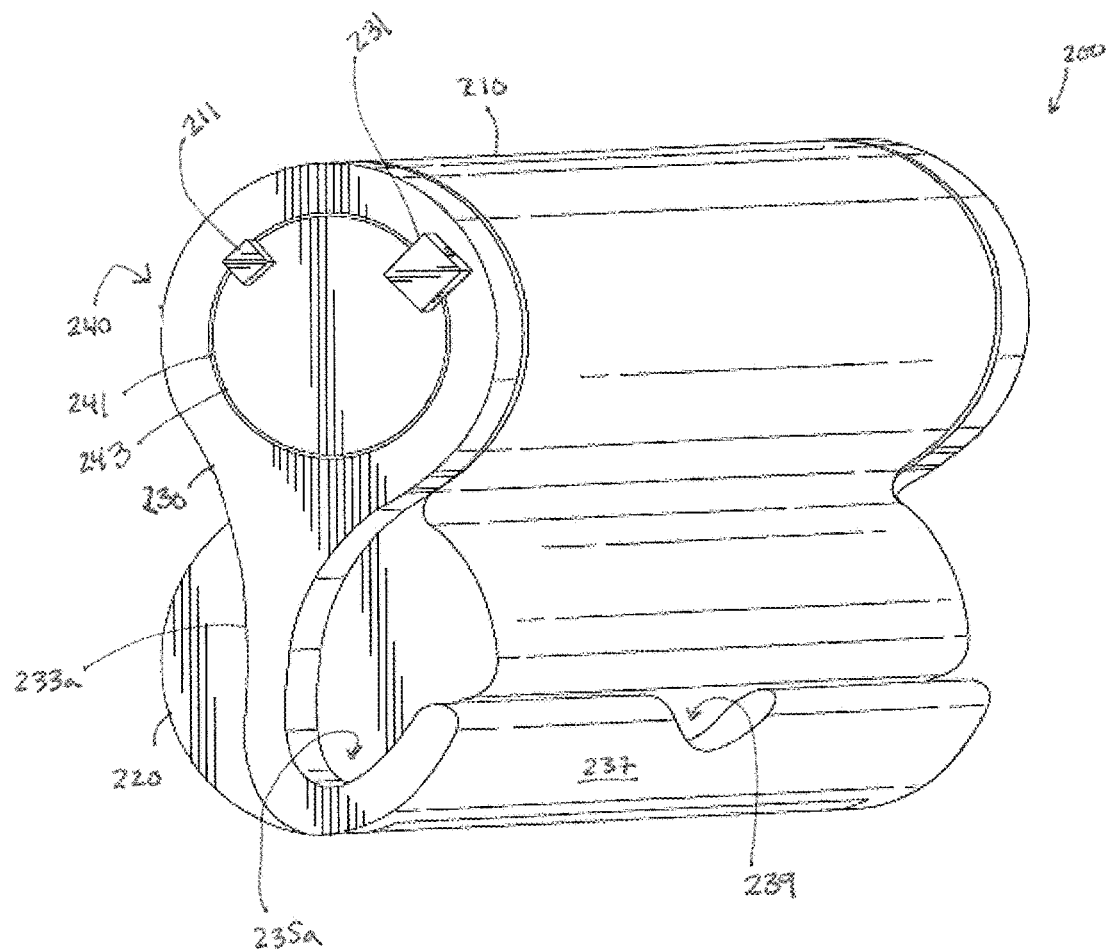
FIG. 2 is a perspective view of a desktop stand in a closed state.
Figure 3:
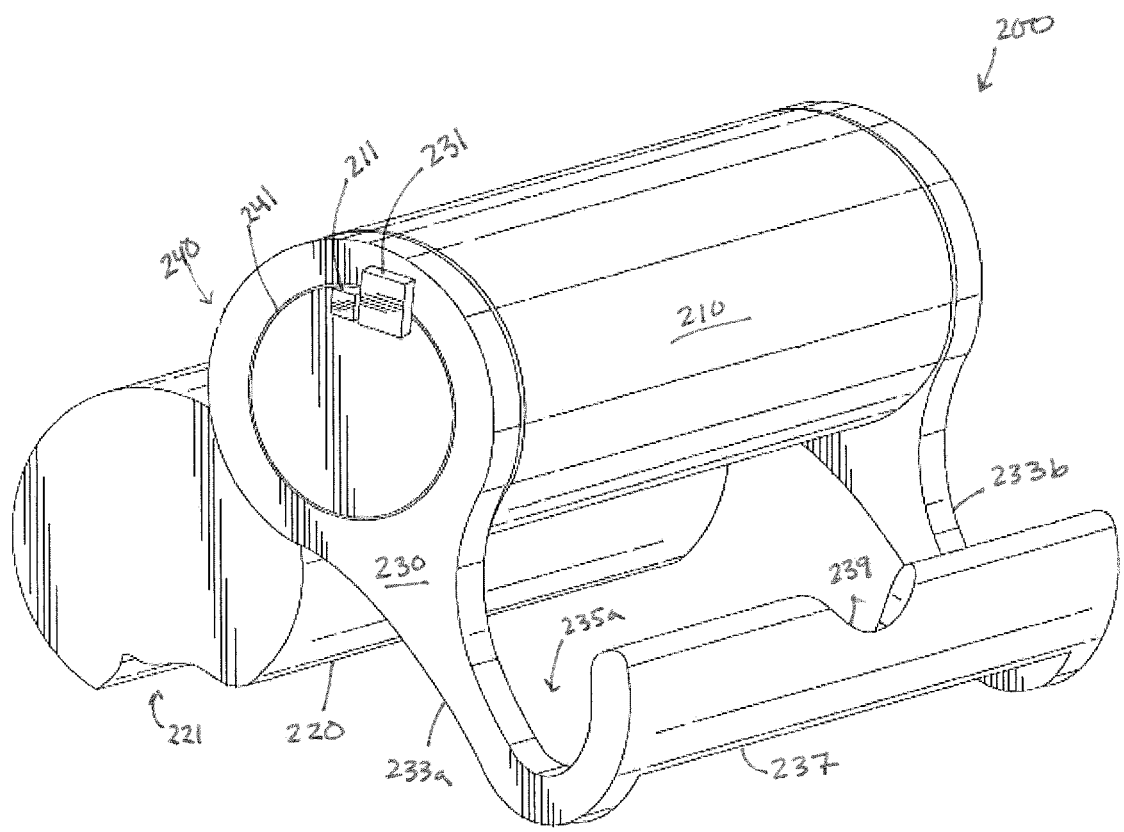
FIG. 3 is a perspective view of a desktop stand in an open state.

A desktop stand 200 is shown in a closed position in FIG. 2 and in an open position in FIG. 3. The desktop stand 200 includes two substantially cylindrical bodies 210, 220, with an extension 230 hinging from the first body 210. The extension 230 includes two arms 233a, 233b, each arm hinging from a respective end of the cylindrical body 210. Each of the two arms 233a, 233b includes a curved region 235a, 235b (visible in FIG. 4). The curved regions are configured to accept a mobile device and cradle the mobile device in a substantially upright position, as shown in FIGS. 1A and 1B. Optionally, the two arms 233a, 233b are connected by a cross-member 237. The cross-member 237 can provide for increased stability of the device 200 when in the open position and can allow for more secure cradling of a mobile device. In addition, with the cross-member 237 present, the arms 233a, 233b can be caused to move concurrently when opening or closing the device 200. The cross-member 237 can optionally include a cut-out region 239, which can provide a user with access to a home button or other interface feature of a mobile device while the mobile device is supported by the stand 200 in a portrait position (e.g., when a length of the device is placed in a vertical, or upright, position).

As illustrated, the extension 230 includes a hinging region 240 having a substantially circular cutout 241 configured to fit over a protrusion 243 (FIG. 6) at the first body 210. Thus, the extension 230 is moveable to a plurality of open positions, with the arms 233a, 233b and the cross-member 237 adjustable to varying distances from the second body 220 as the circular cutout 241 rotates about the protrusion 243. Each position of the arms 233a, 233b and cross-member 237 toward or away from the second body 220 can thus provide for an adjusted viewing angle of a mobile device supported by the stand 200. The first body 210 can include an optional stop 211 configured to engage with a corresponding stop 231 located at or on the extension 230 to limit extension of the arms 233a, 233b and cross-member 237 in an open position. As shown in FIG. 3, the stops 211 and 231 abut one another and prevent further rotation of the hinging region 240, thereby preventing further movement of the arms 233a, 233b and cross-member 237 in a direction away from the second body 220. The stops 211, 231 can be positioned on the first body 210 and the extension 230 such that an optimum viewing angle is reached when the stops 211, 231 bear against one another.

The second body 220 can include a recessed portion 221 configured to accept the arms 233a, 233b and cross-member 237 in the closed position. Thus, the extension 230 can complete a circumference of the cylindrical body 220 in the closed position. With the extension 230 and the second body 220 having complementary features (e.g., the recessed portion 221 complementing the arms 233a, 233b and cross-member 237), the stand 200 can be folded into a compact and visually-appealing storage shape. In its folded state, the stand 200 having the noted complementary features is also less likely to snag on other items.

Figure 4:
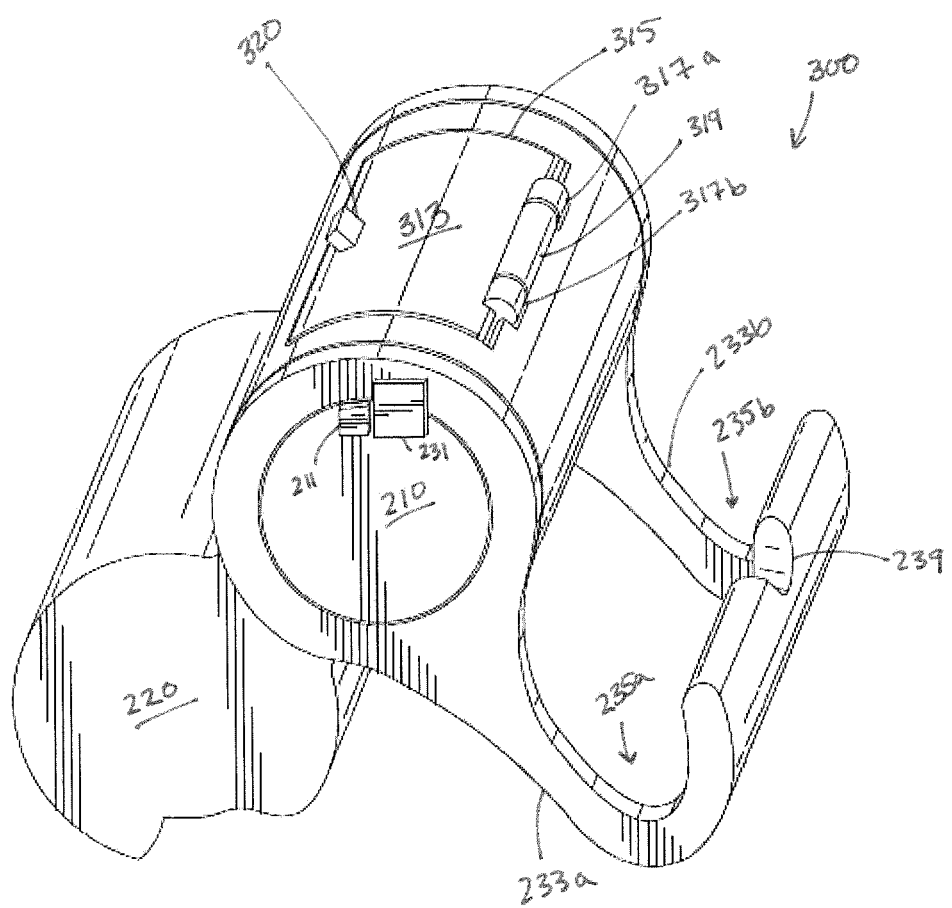
FIG. 4 is a perspective view of another desktop stand in an open state.

Another embodiment of the desktop stand 300 is shown in FIG. 4 having a door 313. The door 313 provides access to a cavity defined within an interior of the body 210. In particular, the first body 210 can be partially or substantially hollow, providing for storage space within the device 300. The first body 210 can include a cut-out region 315 configured to accommodate a shape of the door 313. The door 313 can include a hinge 319 configured to engage with complementary hinge components 317a, 317b on the first body 210, allowing the door to swing open and shut. The door 313 can further include a handle 320 or, alternatively, a recessed portion, to provide a grasp for opening the door 313. A locking feature (not shown) may also be included, where the locking feature can be any type of mechanical mechanism known in the art.

While the desktop stands 100, 200, and 300 are shown with bodies 110, 120, 210, 220 having substantially cylindrical shapes, other geometrical shapes are possible. For example, a first body 210 and a second body 220 can each be substantially rectangular, substantially triangular, or substantially polygonal. In general, first body 110, 210 and second body 120, 220 can be geometrical bodies of any shape, with an extension 130, 230 configured to complete a perimeter of the geometrical body in the closed position. For example, for a stand having rectangular bodies, an extension can be configured to complete the perimeter of a square while the stand is in the closed position. In addition, more than two geometrical bodies can be included. For example, three, four, or more geometrical bodies can be in contact with another, with an extension configured to hinge about the first of the geometrical bodies at one end of the stand, and the extension configured to complete a perimeter of the last of the geometrical bodies at the other end of the stand.

It should be understood that the term "in contact with each other" can mean mechanically coupled to (e.g., slidably, press fit, releasably), integrally formed with, or other mechanical interconnection, such as hook-and-loop complementary features, for temporary interconnection.

Figure 5:
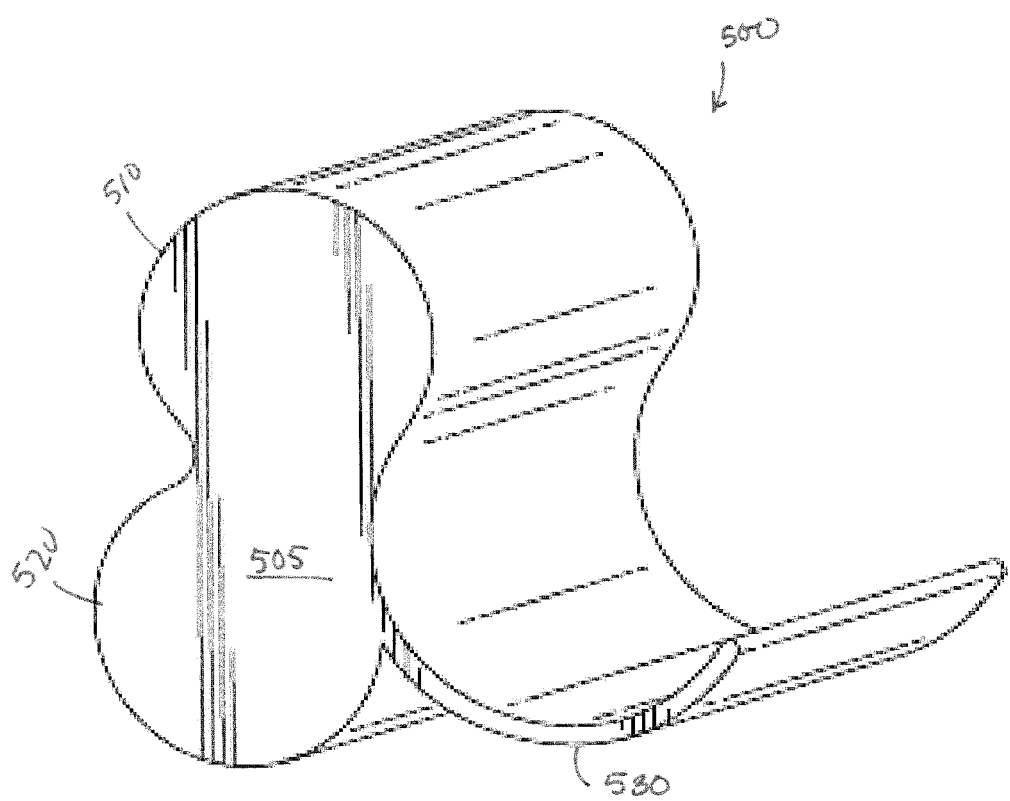
FIG. 5 is a perspective view of yet another desktop stand.

Another example of a mobile device stand is shown in FIG. 5. The mobile device stand 500 has a body 505 having an integrated extension 530. The body 505 has a first cylindrical portion 510 and a second cylindrical portion 520 that are unitary. One or both of the cylindrical portions 510, 520 can contain an integrated power source and/or storage compartments. While the first and second portions 510 and 520 are illustrated as cylindrical, other geometrical shapes are possible. For example, the first and second portions 510 and 520 can be solid rectangles in contact with or integrated with one another.

Figure 6:
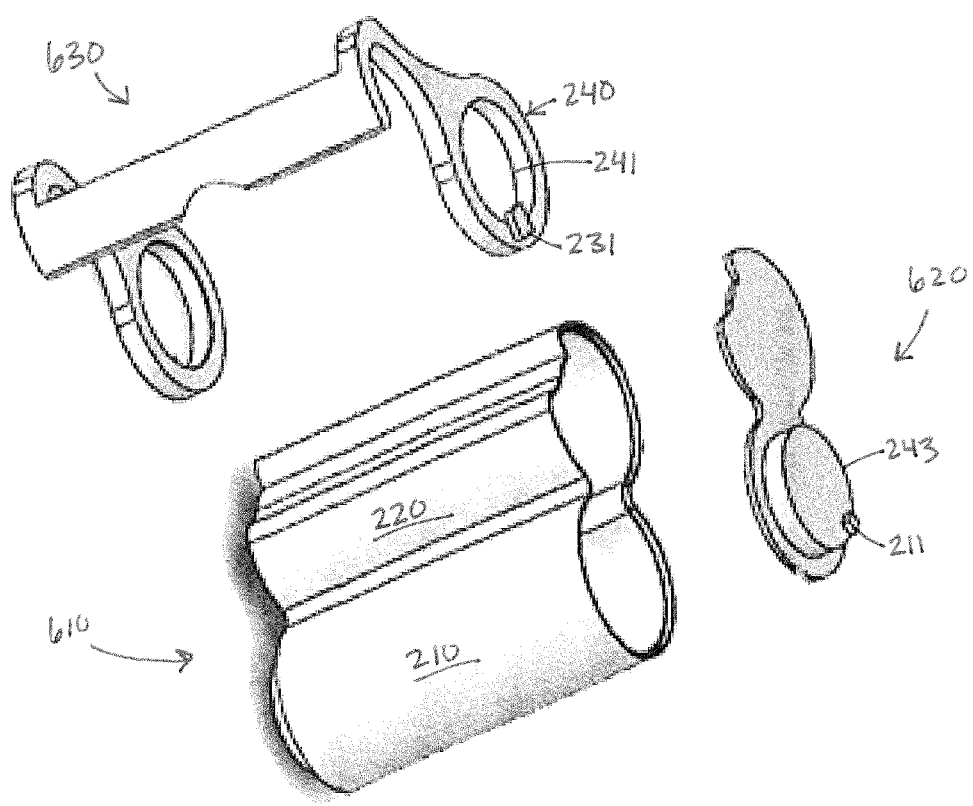
FIG. 6 is an exploded view illustrating components of a desktop stand.

An exploded view of components of a mobile device stand is shown in FIG. 6. In particular, the mobile device stands 100, 200, 300 described above can include several discrete components for ease of manufacturing and assembly. As illustrated in FIG. 6, a first component 610 includes a first cylindrical body 210 and a second cylindrical body 220 that are unitary with one another. Alternatively, the first and second cylindrical bodies 210, 220 can be discrete components. A second component 620 is an endcap configured to engage with first component 610 at the ends of the cylindrical bodies 210, 220. Although only a single second component 620 is shown in FIG. 6, it should be understood that another second component 620 can be included to fit at the other end of cylindrical bodies 210, 220. Additionally, although first and second components 610, 620 are shown as being discrete components for ease of manufacturing, first and second components 610, 620 can be unitary.

A third component 630 is an extension configured to be placed over each of the second components 620 at both ends of first component 610. In particular, the second components 620 each include a protrusion 243 and a stop 211. A circular cut-out of component 630 can be fit around the protrusion 243, with hinging region 240 able to rotate about protrusion 243 and enable the third component 630 to fold toward and away from the first component 610.

Components 610, 620, 630 can be formed by thermoplastic molding or by additive manufacturing techniques, such as 3D printing with polymer inkjet printers. Components 610, 620, 630 can include any suitable plastic material, such as acrylic, polylactic acid (PLA), and polyamides. In particular, components 610, 620, 630 can include acrylonitrile butadiene styrene (ABS), which is a recyclable material that is regarded as safe for human health under normal handling. As mobile device stands may be used by children, ABS can provide high impact resistance while being light weight and safe for handling by children.

A method of manufacturing a mobile device stand includes placing end caps 620 at one or both ends of the first and second geometrical bodies 210, 220 (e.g., cylindrical bodies). The method further includes placing an extension 630 over the end caps 620, such that the extension 630 is configured to hinge from one of the bodies 210 to open and closed positions. The extension 630 completes a perimeter (e.g, a circumference) of the other of the bodies 220 in a closed position and is configured to accept a mobile device in the open position.

Mobile device stands, such as stands 100, 200, 300, allow for easier use of mobile devices, particularly while viewing content on a mobile device for extended periods of time. The mobile device stands 100, 200, 300 advantageously fold up or even disassemble for easy storage while not in use, while simultaneously providing for storage of accessory items, such as power cables and earbuds, and optionally providing an integrated extended power source for the mobile device.

While example embodiments have been particularly shown and described, it will be understood by those skilled in the art that various changes in form and details may be made therein without departing from the scope of the embodiments encompassed by the appended claims.

What is claimed is:

1. A desktop stand, comprising:
   at least two substantially cylindrical bodies in contact with each other; and
   an extension hinging from one of the at least two cylindrical bodies and movable to an open position and a closed position, the extension completing a circumference of another of the at least two cylindrical bodies when in the closed position and configured to accept a mobile device in the open position, the extension including two arms, each arm hinging from a respective end of the one of the at least two cylindrical bodies, wherein each of the two arms includes a curved region configured to cradle the mobile device.

2. The desktop stand of claim 1, wherein the two arms are connected by a cross-member.

3. The desktop stand of claim 2, wherein the cross-member includes a cut-out region configured to expose a button of a mobile device supported by the stand.

4. The desktop stand of claim 1, wherein the extension is movable to a plurality of open positions, each position adjusting a viewing angle of a mobile device supported by the stand.

5. The desktop stand of claim 1, wherein the at least two substantially cylindrical bodies are unitary.

6. The desktop stand of claim 1, wherein at least one of the cylindrical bodies is substantially hollow.

7. The desktop stand of claim 6, wherein the at least one hollow cylindrical body includes a door providing access to a storage compartment within the body.

8. The desktop stand of claim 1, wherein at least one of the cylindrical bodies is configured to enclose a power source for a mobile device.

9. The desktop stand of claim 8, wherein the power source is a battery.

10. The desktop stand of claim 8, wherein the power source is an AC/DC converter.

11. A desktop stand, comprising:
    means for retaining a mobile device in a substantially upright position with a moveable extension in an open position; and
    means for adjusting the movable extension to a closed position, the movable extension completing a circumference of a cylindrical body of the means for retaining the mobile device when the extension is in the closed position, wherein the moveable extension includes two arms, each arm hinging from a respective end of the means for retaining the mobile device, each of the two arms including a curved region configured to cradle the mobile device.

12. A desktop stand, comprising:
    at least two solid geometric bodies in contact with each other; and
    an extension hinging from a given one of the at least two solid geometric bodies and movable to an open position and a closed position, the extension completing a shape of another of the at least two solid geometric bodies when in the closed position and configured to accept a mobile device in the open position, the extension including two arms, each arm hinging from a respective end of the given solid geometric body, wherein each of the two arms includes a curved region configured to cradle the mobile device.

13. A desktop stand, comprising:
    at least two substantially cylindrical bodies in contact with each other; and
    an extension hinging from one of the at least two cylindrical bodies and movable to an open position and a closed position, the extension completing a circumference of another of the at least two cylindrical bodies when in the closed position and configured to accept a mobile device in the open position, the extension including two arms connected by a cross-member, each arm hinging from a respective end of the one of the at least two cylindrical bodies, wherein the cross-member includes a cut-out region configured to expose a button of a mobile device supported by the stand.

14. A desktop stand, comprising:
at least two substantially cylindrical bodies in contact with each other; and
an extension hinging from one of the at least two cylindrical bodies and movable to an open position and a closed position, the extension completing a circumference of another of the at least two cylindrical bodies when in the closed position and configured to accept a mobile device in the open position, at least one of the cylindrical bodies being substantially hollow and including a door providing access to a storage compartment within the cylindrical body.

15. A desktop stand, comprising:
at least two substantially cylindrical bodies in contact with each other; and
an extension hinging from one of the at least two cylindrical bodies and movable to an open position and a closed position, the extension completing a circumference of another of the at least two cylindrical bodies when in the closed position and configured to accept a mobile device in the open position, at least one of the cylindrical bodies being substantially hollow and configured to enclose a power source for the mobile device.

* * * * *